United States Patent [19]

Lin

[11] Patent Number: 5,111,802

[45] Date of Patent: May 12, 1992

[54] BARBECUE

[76] Inventor: Patrick Lin, 14th Fl., No. 228, Sec. 3, Minsheng E. Rd., Taipei, Taiwan

[21] Appl. No.: 763,117

[22] Filed: Sep. 20, 1991

[51] Int. Cl.$^5$ .............................................. A47J 37/00
[52] U.S. Cl. ..................................... 126/25 R; 16/357
[58] Field of Search ............... 126/25 R, 9 R, 41 R, 126/25 A, 37 B, 194, 197, 211, 25 C; 220/85 CH; 16/357

[56] References Cited

U.S. PATENT DOCUMENTS 3,611,915 10/1971 Glaser et al. ..................... 126/25 R
3,714,937 2/1973 Linstead ............................ 126/25 R
3,734,076 5/1973 Koziol ............................... 126/25 R Primary Examiner—James C. Yeung
Attorney, Agent, or Firm—Peterson, Wicks, Nemer & Kamrath

[57] ABSTRACT

A cover-positioning device for a barbecue has a substantially L-shaped slot including a first end and a second end and a bolt. The cover-positioning device for a barbecue is fixed to a barbecue body. The bolt is inserted through the slot and slidable along the slot. The bolt is then fixed to a barbecue cover. When the bolt is in the first end of the slot, the barbecue body is covered. The barbecue cover can be remain opened with the bolt being in the second end of the slot.

1 Claim, 3 Drawing Sheets

FIG._2.

BARBECUE

BACKGROUND OF THE INVENTION

The present invention relates to a barbecue, and, more particularly, to a barbecue smoker.

Conventionally, a user has to remove a cover from a barbecue in order to take out cooked food and/or add raw food in. The user has to carry the cover with one hand and take care of matters with the other hand, and this is inconvenient.

Therefore, the present invention is intended to obviate or at least to mitigate the above-mentioned problems.

SUMMARY OF THE INVENTION

It is an object of the present invention to provide a barbecue having a body, a cover, and two cover-positioning plates. The cover-positioning plates are fixed to the body and each include a slot. The cover is fixed with two bolts. Each of the bolts is insertable through and slidable along the slot, so that the cover can be opened and restrained on the cover-positioning plates.

Additional objects, if not specifically set forth herein, will be readily apparent to those skilled in the art from the detailed description of embodiments below, with reference of the accompanying drawings.

DESCRIPTION OF THE INVENTION

Figure 1:
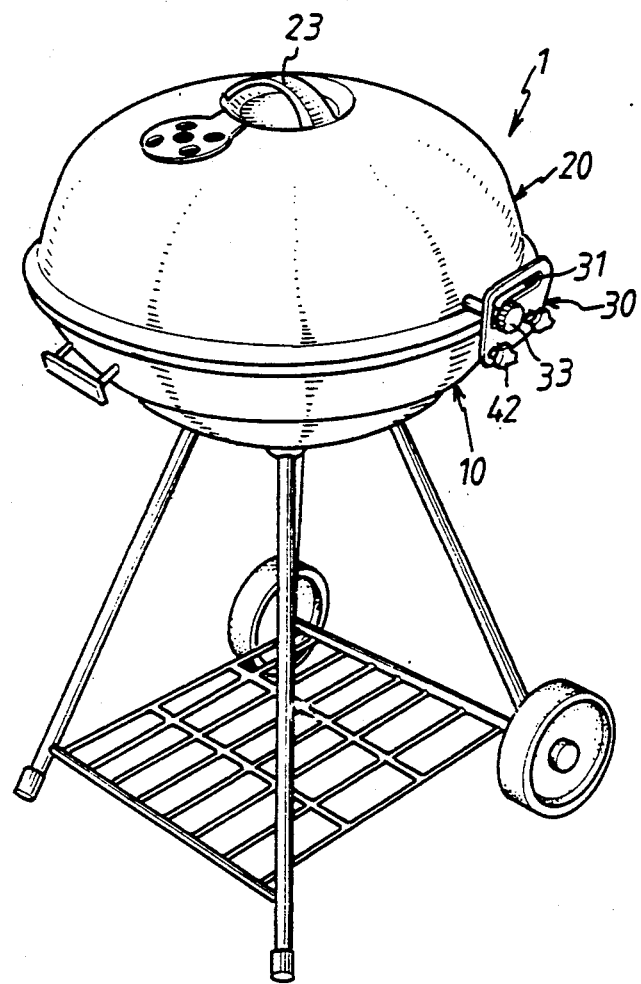
FIG. 1 is a perspective view of a barbecue in accordance with the present invention.

Referring to FIG. 1, a barbecue 1 has a body 10, a cover 20, and two cover-positioning plates 30 (only one is shown).

Figure 2:
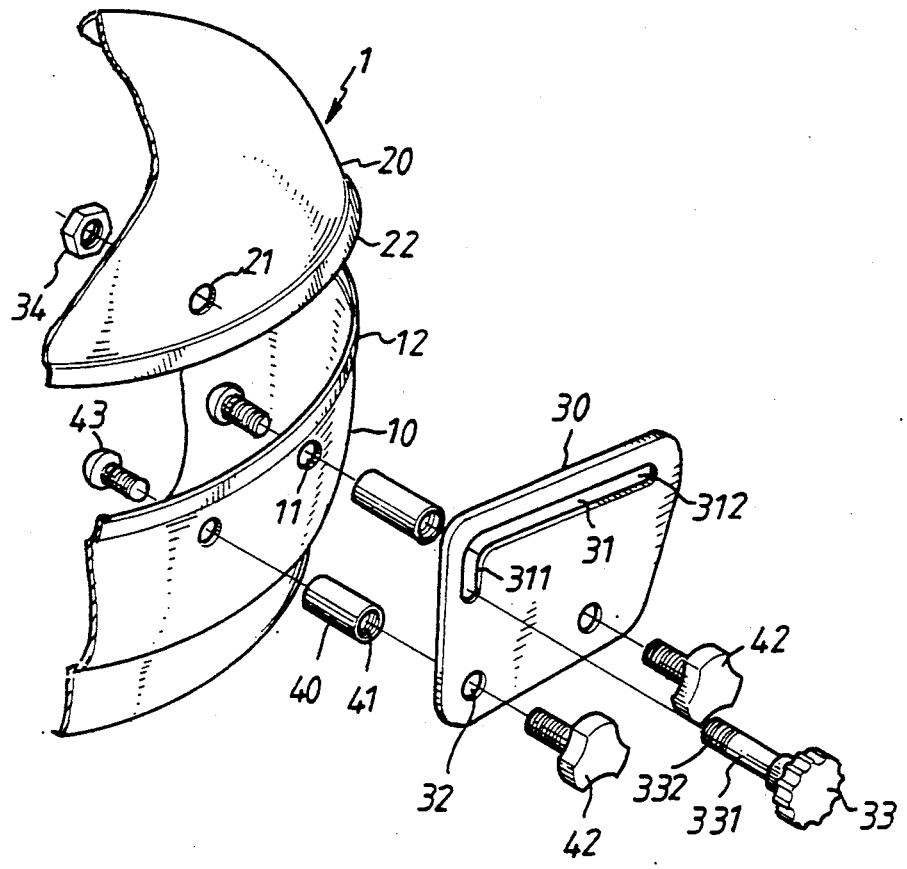
FIG. 2 is an enlarged exploded perspective view of a cover-positioning plate of the barbecue in accordance with the present invention.

Referring to FIG. 2, a body 10 has two groups of holes 11 being arranged below a rim 12. Each group of holes 11 is distributed on a side of the body 10 opposite to each other.

The cover 20 has two holes 21 being arranged above a rim 22 and a handle 23 (see FIG. 1). Each hole 21 is located on a side of the cover 20 opposite to each other.

Each of the cover-positioning plates 30 has an L-shaped slot 31 and a plurality of holes 32 each corresponding to one of the holes 11. The slot 31 defines a first end 311, a second end 312, and a middle portion being arranged between and above the two ends 311 and 312.

An engaging assembly has a plurality of tubes 40 each defining an inner thread 41, a plurality of outer threaded bolts 42, and a plurality of inner threaded bolts 43.

Each of the outer threaded bolts 42 is inserted through one of the holes 32 and secured to the inner threads 41, thereby engaging the cover-positioning device 30 with the tube 40. The inner threaded bolts 43 are inserted through the holes 11 and secured to the inner threads 41, thereby engaging the cover-positioning device 30 with the body 20.

A bolt 33 has an unthreaded portion 331 and a threaded portion 32. The bolt 33 is inserted through the slot 31 and the hole 21, and is then secured to a nut 34. The unthreaded portion 331 is slidable along the slot 31.

Figure 3:
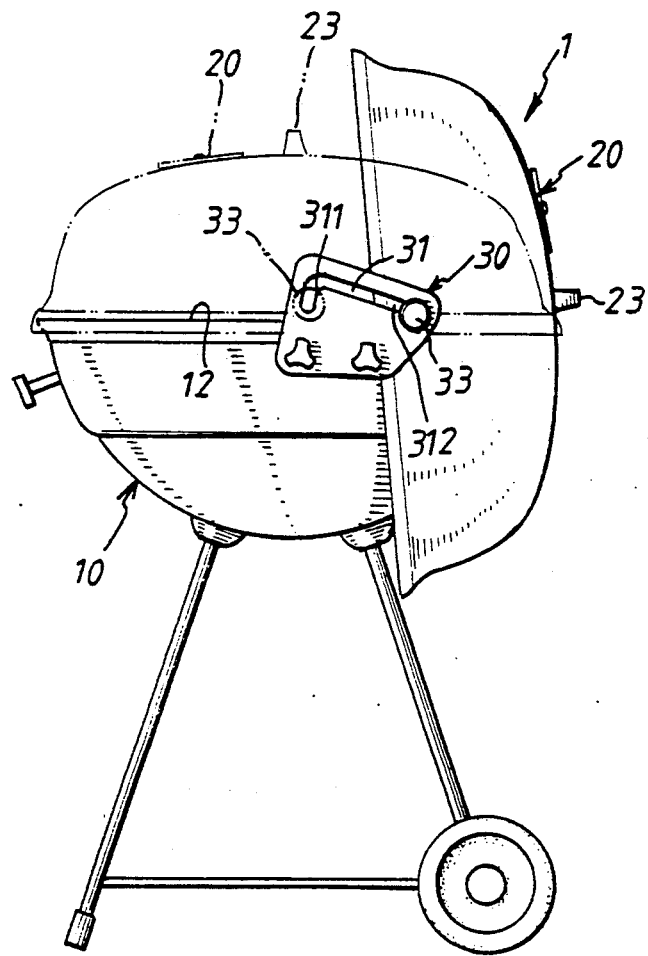
FIG. 3 is a side plan view of a barbecue, showing a cover residing in a closed position and in an opened position in accordance with the present invention.

Referring to FIG. 3, as shown in phantom line, the bolt 33 is in the first end 311 of the slot 31 while the rim 22 encompasses the rim 12, thereby covering the body 10 with the cover 20. A user can lift the cover 20 by the handle 23. The user can move the cover 20 in a certain direction thereby urging the bolt 33 from the first end 311 along the slot 31 to the second end 312. The cover 20 is then turned vertically and maintained in such a position.

While the present invention has been explained in relation to its preferred embodiment, it is to be understood that various variations thereof will be apparent to those skilled in the art upon reading this specification. Therefore, the invention disclosed herein is intended to cover all such variations as shall fall within the scope of the appended claims.

What I claim is:

1. A barbecue comprising:
   a body including two opposite portions each being formed with a group of holes;
   a cover for covering said body including two opposite portions each being formed with a hole; and
   two cover-positioning devices each including:
   a plate defining a substantially L-shaped slot including a first end, a second end, and a middle portion being arranged between and above said ends;
   a plurality of holes each corresponding to one of said holes of said body;
   a plurality of tubes each defining an inner thread;
   a plurality of threaded bolts each being insertable through one of said holes of said plate and engaging with said inner thread, thereby securing said plate to said tube;
   a plurality of threaded bolts each being insertable through one of said holes of said body and engaging with said inner thread, thereby securing said plate to said body; and
   two bolts each being insertable through said slot and including an unthreaded portion being slidable along said slot and a threaded portion being insertable through said hole of said cover and engageable with a nut.

* * * * *